Patented Aug. 10, 1943

2,326,643

UNITED STATES PATENT OFFICE 2,326,643

COMPLEX POLYAMINO SULPHUR COMPOUND

William F. Hester, Drexel Hill, Pa., assignor to Röhm & Haas Company, Philadelphia, Pa., a corporation of Delaware No Drawing. Application August 20, 1941, Serial No. 407,673

5 Claims. (Cl. 260—125)

This invention relates to reaction products from carbon disulphide, sulphur chloride, and an aliphatic polyamine having hydrogen atoms on at least two amino nitrogen atoms. These products are formed by combining an aliphatic polyamine with carbon disulphide in the presence of a basic material to form a polydithiocarbamate and reacting this compound with sulphur chloride. The products thus obtained are valuable as active fungicidal ingredients in agricultural sprays or dusts.

As an aliphatic polyamine there may be used ethylene diamine, propylene diamine, pentamethylene diamine, diethylene triamine, triethylene tetramine, tetraethylene pentamine, bis-(aminoethyl) propylene diamine, piperazine.

As a base there may be used sodium hydroxide, potassium hydroxide, ammonium hydroxide, a quaternary ammonium hydroxide such as benzyl trimethyl ammonium hydroxide, a strongly basic amine, such as ethylene diamine, or other basic material capable of forming thiosalts together with the polyamine and carbon disulphide.

In the preparation of the products of this invention polyamine, carbon disulphide, and a base are first reacted, preferably in aqueous solution to give a polydithiocarbamate as an intermediate, which may, if desired, be recrystallized. The intermediate is then reacted with sulphur chloride which may be a mono- or poly-sulphide in the presence of a solvent or diluent, such as water, benzene, toluene, or other relatively inert organic solvent. It is generally necessary to cool the reaction mixture at least at the start. Thereafter the temperature may be permitted to rise. The products as obtained may be washed with water or purified from organic liquids and dried.

Analyses of the reaction products show that in their formation one mol of polyamine combines with at least two mols of carbon disulphide and at least one mol of a sulphur chloride. The melting ranges indicate that the reaction product is composed of a number of compounds rather than any single compound, although by recrystallization compounds of the same nitrogen-sulphur ratio may be obtained which melt within a narrow range.

The method of preparing the products of this invention is illustrated in the following examples.

Example 1

A mixture was prepared from 240 g. of sodium hydroxide, 240 g. of water, and 250 g. of ethylene diamine of a commercial grade containing 72% of the diamine and cooled. To this mixture was slowly added 478 g. of carbon disulfide while the temperature of the reacting mixture was held below 25° C. by cooling. After all the carbon disulfide had been added, stirring was continued for about two hours, after which time the mixture became solid. After it had stood overnight, it was recrystallized from ethyl alcohol in a yield of 868 g. of air-dried material.

This solid was crushed and stirred into 3000 cc. of dry toluene. To this mixture was slowly added 405 g. of sulphur mono-chloride while the temperature of the reacting mixture was held between 15° and 38° C. After the reaction mixture had been stirred for two hours, it was filtered to separate the reaction product. The reaction product was washed with toluene, washed with water, air-dried for 16 hours, and dried in an oven at 80° C. for five hours. A sample of this product was recrystallized from hexone and this material was analyzed for nitrogen and sulphur. It contained 10.2% nitrogen and 74% sulphur.

Example 2

A mixture of 320 g. of sodium hydroxide and 302 g. of propylene diamine (73.5% commercial diamine) was cooled while 501 g. of carbon disulphide was slowly added thereto during a 45 minute interval. The mixture was stirred until it became solid and was then recrystallized from ethanol to give 700 g. of a solid melting between 55° and 60° C.

350 g. of this solid was powdered and suspended in 1500 cc. of dry toluene and then treated with 202 g. of sulphur monochloride while the temperature of the reacting mixture was held below 10° C. The mixture was then stirred for two hours and filtered. The solid which was separated was washed with water, air-dried, and then dried in an oven at 75°–80° C. The product melted between 140° and 145° C.

Example 3

Disodium bisdithiocarbamate was prepared as in Example 1 and 800 g. of the recrystallized product was taken up in 1600 cc. of water. The solution was cooled and sulphur monochloride slowly added thereto until a total of 320 g. had been added during the course of about six hours. The stirring was continued for another three hours and the reaction mixture allowed to settle. The solid material was filtered off, washed with water, and dried at 80° C. for 24 hours. The resulting product melted over a range of 110° to 190° C. and contained by analysis about 10% of nitrogen and 70% of sulphur.

The reaction product obtained from ethylene diamine, carbon disulfide, and sulphur chloride was used in aqueous sprays against fungus on plants. Sprays containing two pounds per hundred gallons were repeatedly used on cherry, choke cherry, apple, and elm trees, and on currant, lilac, forsythia, spiraea, barberry, and privet bushes without harmful effects to the host plants. Sprayed on rose bushes to control powdery mildew, it gave as good control at one pound per hundred gallons as finely divided sulphur at two pounds per hundred gallons. It was sprayed on hothouse rose bushes at two pounds per hundred gallons for the control of black spot at weekly intervals over a six week period. At the end of this time the incidence of disease was determined by counting the number of diseased leaves on ten plants and the number of spots on ten plants. The counts were repeated after a one-week interval. Results are tabulated herewith.

| Compound | Spots per 10 plants | | Diseased leaves per 10 plants | |
|---|---|---|---|---|
| | 1st count | 2nd count | 1st count | 2nd count |
| Spray A | 88 | 35 | 35 | 21 |
| Spray B | 96 | 46 | 38 | 26 |
| Spray C | 238 | 409 | 80 | 115 |

Spray A contained in addition to two pounds per hundred gallons of the reaction product from ethylene diamine, carbon disulphide, and sulphur chloride one-half pound of a wetting agent made from polyglycerol, cocoanut fatty acid, and phthalic anhydride.

Spray B contained in addition to two pounds of the reaction product from ethylene diamine, carbon disulphide, and sulphur chloride one-half pound of an emulsifiable oil per hundred gallons.

Spray C was a standard copper fungicidal spray regularly used in the greenhouses where the tests were made.

The reaction products from ethylene diamine, carbon disulphide, and sulphur chloride were also used for the control of scab and rust on apples. Incidence of rust was evaluated on a scale from 0 to 1 and the per cent. of rusty fruit determined from counts on 1500 apples. Results were as follows for various treatments: For the reaction product of ethylene diamine, carbon disulphide, and sulphur chloride—foliage index 0.148 and rusty fruit 0.25%; for mercaptobenzothiazole—0.178 and 3.4%; for ferric dimethyl dithiocarbamate—0.358 and 10.3%; for finely divided sulphur—0.365 and 13.6%.

The compounds of this invention also exhibit insecticidal activity. For example, against the larvae of the Mexican bean beetle a control of 86% is obtained with a 1% spray using the reaction product of ethylene diamine, carbon disulphide, and sulphur chloride. The comparable product from propylene diamine gave a control of 92% at 1% and of 80% at 0.5%, while the comparable product from piperazine at 1% gave a control of 76%, compared to a control of 70% for a 1% magnesium arsenate.

The reaction products of this invention are also useful in the compounding of rubber.

I claim:

1. The reaction products obtained by combining an aliphatic polyamine with at least two molecular proportions of carbon disulphide in the presence of a base to form a polydithiocarbamate and reacting said polydithiocarbamate with a sulphur chloride.

2. The reaction products obtained by combining an alkylene polyamine with at least two molecular proportions of carbon disulphide in the presence of a base to form a polydithiocarbamate and reacting said polydithiocarbamate with sulphur monochloride.

3. The reaction products obtained by combining ethylene diamine with at least two molecular proportions of carbon disulphide in the presence of a base to form a bisdithiocarbamate and reacting said bisdithiocarbamate with sulphur chloride.

4. The process of combining an aliphatic polyamine with at least two molecular proportions of carbon disulphide in the presence of a base to form a polydithiocarbamate and reacting said polydithiocarbamate with a sulphur chloride.

5. The process of combining ethylene diamine with at least two molecular proportions of carbon disulphide in the presence of a base to form a bisdithiocarbamate and reacting said bisdithiocarbamate with sulphur monochloride.

WILLIAM F. HESTER.